(12) United States Patent
Wischmann et al.

(10) Patent No.: US 9,088,011 B2
(45) Date of Patent: Jul. 21, 2015

(54) BIPOLAR PLATE FOR A FUEL CELL AND FUEL CELL STACK

(75) Inventors: Stefan Wischmann, Berlin (DE); Horst Walter Tamler, Witten (DE); Roland Wunderlich, Bergkamen (DE); Michael Steinhorst, Essen (DE); Krasimir Nikolov, Dortmund (DE); Nicole Weiher, Bochum (DE); Jens-Ulrik Becker, Duisburg (DE); Stefan Peter Puls, Dortmund (DE); Bernd Schuhmacher, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 680 days.

(21) Appl. No.: 12/667,984

(22) PCT Filed: Jul. 3, 2008

(86) PCT No.: PCT/EP2008/058582
§ 371 (c)(1),
(2), (4) Date: Mar. 10, 2010

(87) PCT Pub. No.: WO2009/007299
PCT Pub. Date: Jan. 15, 2009

(65) Prior Publication Data
US 2010/0178579 A1    Jul. 15, 2010

(30) Foreign Application Priority Data
Jul. 9, 2007    (DE) .......................... 10 2007 032 116

(51) Int. Cl.
*H01M 8/24*    (2006.01)
*H01M 8/02*    (2006.01)
*H01M 8/08*    (2006.01)
*H01M 8/10*    (2006.01)

(52) U.S. Cl.
CPC ............ *H01M 8/021* (2013.01); *H01M 8/0228* (2013.01); *H01M 8/0213* (2013.01); *H01M 8/0221* (2013.01); *H01M 8/086* (2013.01); *H01M 2008/1095* (2013.01); *Y02E 60/50* (2013.01)

(58) Field of Classification Search
USPC ......................................................... 429/519
See application file for complete search history.

(56) References Cited

U.S. PATENT DOCUMENTS 4,670,300 A  *  6/1987  Stewart, Jr. ................... 427/115
5,624,769 A  *  4/1997  Li et al. .......................... 429/465
6,649,031 B1 * 11/2003  Iqbal et al. ............... 204/192.15

(Continued)

FOREIGN PATENT DOCUMENTS

DE        102004056846  A1       6/2006

*Primary Examiner* — Patrick Ryan
*Assistant Examiner* — Jose Colucci Rios
(74) *Attorney, Agent, or Firm* — The Webb Law Firm

(57) ABSTRACT

A bipolar plate which can be produced particularly economically for a fuel cell, with which a high degree of efficiency is guaranteed over a long service life. The bipolar plate has a core layer consisting of a steel material, the surfaces of said core layer, which are associated with the respective electrolyte carriers of the fuel cell, having a corrosion protection layer, protecting the core layer against corrosion. The corrosion protection layers consist of a metal material and extend on both sides over the whole surface of the core layer. At the same time the corrosion protection layers are in turn coated over the whole surface with an electrically conductive functional coating, which is essentially entirely impermeable for the metal ions emerging from the core layer and/or the corrosion protection layers. The invention likewise relates to at least one fuel cell comprising a bipolar plate according to the invention.

17 Claims, 2 Drawing Sheets

(56) References Cited

U.S. PATENT DOCUMENTS

Figure 1:
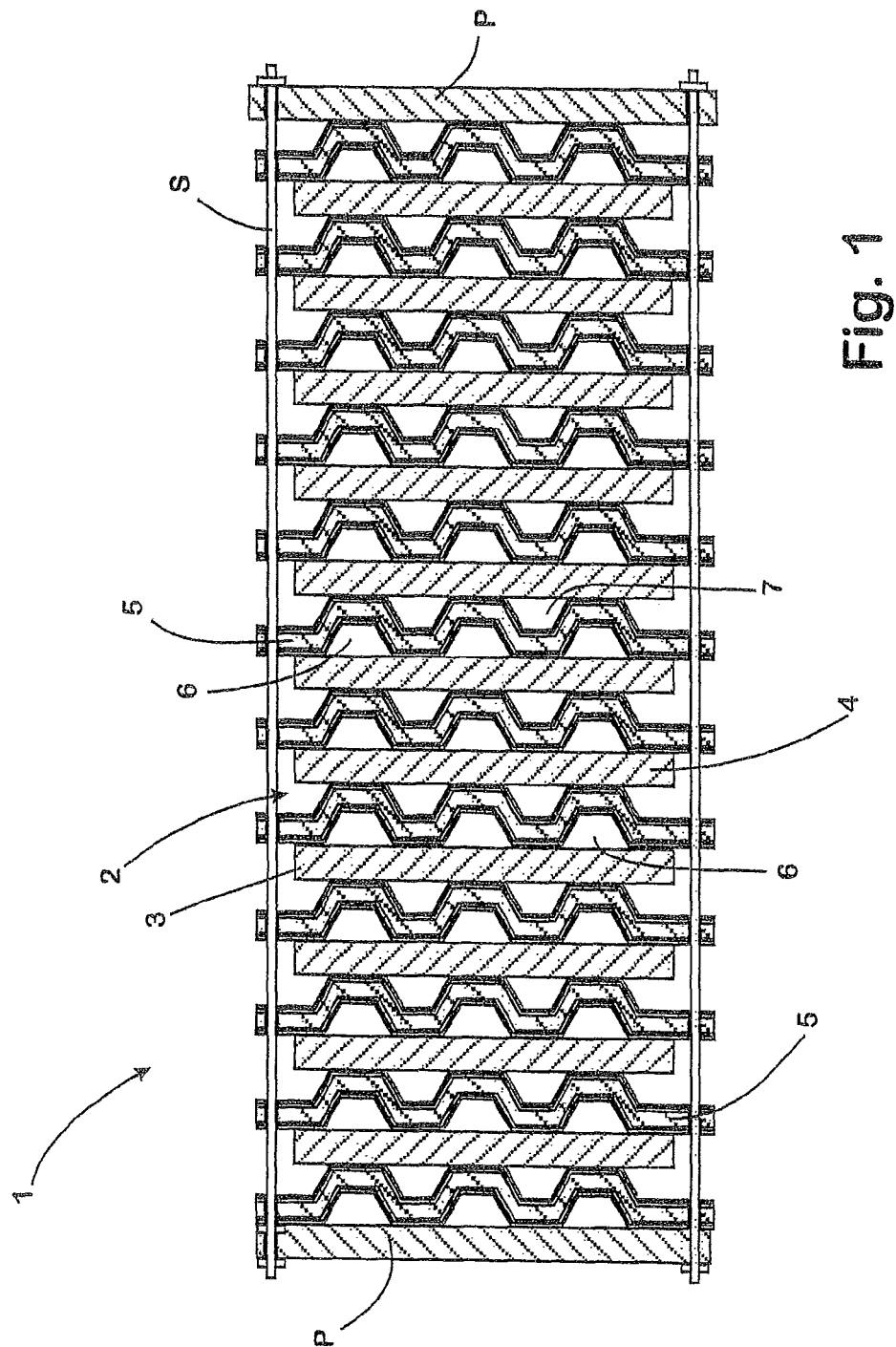

| | | | |
|---|---|---|---|
| 6,699,593 B2* | 3/2004 | Kaneta et al. | 428/670 |
| 2003/0027028 A1* | 2/2003 | Davis | 429/34 |
| 2004/0253501 A1 | 12/2004 | Ohtani et al. | |
| 2005/0191504 A1* | 9/2005 | Brady | 428/457 |
| 2006/0286432 A1* | 12/2006 | Rakowski et al. | 429/38 |

* cited by examiner

US 9,088,011 B2

BIPOLAR PLATE FOR A FUEL CELL AND FUEL CELL STACK

The invention relates to a bipolar plate for a fuel cell with a core layer consisting of a steel material, the surfaces of said core layer, which are associated with the respective electrolyte carriers of the fuel cell, being provided in each case with a corrosion protection layer protecting the core layer against corrosion. In addition to this, the invention also relates to a fuel cell stack provided with a bipolar plate of this type.

A fuel cell consists in general of two electrodes (anode and cathode) with an electrolyte located between them. The anode is provided with a fuel (e.g. hydrogen), and the cathode with the oxidant (oxygen).

A variety of different fuel cell types are known, which differ in the electrolyte used in them. With a fuel cell of the PEM type (PEM=Polymer Electrolyte Membrane), the electrolyte consists of a thin membrane, which on the one hand separates the two substances involved in the reaction. On the other, the membrane serves as a hydrogen ion conductor and in the wet state ensures the passage of protons from the anode side to the cathode side.

A catalyst layer is applied on both sides of the membrane, which is necessary for the reaction of the cell. The catalyst layer is usually additionally bordered by a gas diffusion layer, which is intended to ensure optimum gas conveyance and to provide the catalyst layer with the gases required as uniformly as possible. In addition to this, the product water is conveyed away via the gas diffusion layers. Electrolyte membrane, catalyst layer, and gas diffusion layer of anode and cathode together form a compact unit, referred to as the "Membrane Electrolyte Assembly", also referred to in short as "MEA".

The MEA is typically arranged between two so-called bipolar plates, from which and to which the electrons migrate via the respective electrical consumer. In practice, many fuel cells are connected in series and stacked into an effective "stack" in order to be able to provide the voltages necessary for the particular application. In this situation the bipolar plates form the connecting piece between the cathode and anode of two adjacent cells and are therefore both the positive and negative poles for one of the two adjacent cells in each case. A further important task of the bipolar plates in a fuel cell stack is to guarantee the surface gas supply of the electrodes and the membrane and to accommodate the forces which are required to hold the stack together.

PEM fuel cells based on an electrolyte membrane operate in the temperature range from 20-120° C. and with the present state of the art supply power values of multiple hundred kilowatts.

Higher outputs can be achieved with high-temperature fuel cells, with which phosphoric acid is used as the electrolyte, and which are operated at 160-220° C. Such high-temperature fuel cells are designated in short as "PAFC". In PAFC the highly-concentrated phosphoric acid (90-100%) is usually fixed in a polytetrafluoroethylene fibre structure which serves as an electrolyte carrier. Like all fuel cells, it produces current by the oxidation of a combustion gas. As with the PEM, it is usually hydrogen that serves as the combustion gas. Air or pure oxygen may be used as the oxidation agent.

Both in fuel cells of the PEM type as well as in fuel cells of the "PAFC" type, the bipolar plates are subjected to a strong corrosive attack. Accordingly, they must possess not only high electrical conductivity and good temperature resistance, but they must also be made of a material which can be readily shaped, in order that the shaped elements required for the fuel delivery and removal, such as channels and partition walls, can be easily formed into them. At the same time, the bipolar plates must possess a high mechanical stability with low thickness and be gas-impermeable, in order that the chambers of the fuel cell can be securely sealed from one another and in relation to the surroundings.

In the past, graphite or graphite resins have been used as the material for bipolar plates. Accordingly, in prefabricated graphite blocks the channels required for the gas supply are milled in by mechanical means or graphite powder is pressed into appropriately preshaped moulds to form bipolar plates, while bipolar plates have been produced from graphite resins using the injection moulding process. The advantage of using graphite or resins containing graphite lay in the fact that the bipolar plates manufactured from these materials had high resistance to corrosion with good electrical conductivity. However, the effort involved with the manufacture of bipolar plates from graphite is considerable and their price is correspondingly high. In addition to this, bipolar plates manufactured from graphite or graphite resin have a comparably high minimum thickness, in order to be able to resist the mechanical loads imposed upon them in practical use.

Both because of their high price and because of the minimum thickness required, and the structural length required as a result of the fuel cells made up of them, efforts are increasingly being made to replace in practice the bipolar plates manufactured from materials containing graphite by metallic bipolar plates.

An example of a metallic bipolar plate of this type is described in DE 10 2004 056 846 A1. The known bipolar plate has a core layer which is made of steel. First a layer providing protection against corrosion is applied over the whole surface of the core layer made of steel. At the places at which the bipolar plate comes into contact with the adjacently arranged membrane electrodes, this layer is then ground off, in order then, in a locally limited fashion, to be able to apply a layer with good conductivity. The channels needed for conveying the medium are formed into the bipolar plate coated in this way in such a manner that the side walls of the channels are covered with the corrosion protection layer, while the webs remaining between the channels carry the layer with good conductivity in the area of their web surface which comes into contact with the respective MEA.

With the bipolar plate known from DE 10 2004 056 846 A1, a high level of corrosion protection is guaranteed in the area of heaviest corrosion attack, namely in the conveying channels, and good electrical conductivity is guaranteed in the area which is important for the electrical contacting.

However, not only does this require a relatively complicated manufacturing process comprising many working steps, but also an extremely high degree of manufacturing precision must be guaranteed in the forming and shaping of the bipolar plate. Otherwise, in particular in the unprotected area of the transition between the channels and the contact surfaces, heavy corrosion may occur, which can lead to the premature failure of the fuel cell.

A further bipolar plate in the manner specified in the preamble of claim 1 is known from US 2004/0253501. This bipolar plate being designed for a fuel cell of the PEM type features a core layer made of special steel on which a layer consisting of gold is applied, wherein between the gold layer and the core layer an intermetallic compound layer is formed, by the means of which the adhesion of the gold layer on the core layer shall be improved. The bipolar plate being constructed in this way is not only expensive to manufacture, but there is also the risk, that it does not withstand the stresses occurring in practice for a sufficiently long time.

Against this background, the object of the invention was to provide a bipolar plate and a fuel cell stack fitted with a bipolar plate of this type, which on the one hand can both be manufactured economically and on the other can both be used with a high degree of efficiency over a long period of service.

This object is achieved according to the invention in relation to the bipolar plate in that a bipolar plate of this type is designed in accordance with Claim 1. The claims referring back to Claim 1 contain advantageous embodiments falling under the invention of a bipolar plate of this type according to the invention.

A bipolar plate according to the invention intended for a fuel cell has a core layer consisting of a steel material. A steel material of this type is not only economical to procure but can also be shaped particularly well and with comparatively simple means. In addition to this, it also possesses high strength. For a bipolar plate constituted in the manner according to the invention, therefore, not only problem-free mechanical properties can be guaranteed, which resist all mechanical loadings arising in practical use, but a bipolar plate according to the invention can also be manufactured particularly economically.

The steel core layer of a bipolar plate according to the invention is provided on its surfaces associated with the respective electrodes of the fuel cell in each case with a corrosion protection layer, protecting the core layer against corrosion. It is important that the corrosion protection layers applied onto the core layer on both sides consists in each case of a metal material and extends on both sides over the whole surface of the core layer. The choice of material and the extension of the corrosion protection layer over the whole surfaces of the core layer, which surfaces being subjected to the corrosive attack of the respective fuel or of the reaction product, not only support a particularly simple manufacture of the bipolar plate according to the invention, but also ensure that the core layer as a whole is protected against corrosion and the risk is excluded of a local attack in the area of places at which direct and immediate corrosion protection is missing. Accordingly, conventional processes which have long been known from the sector of the manufacture of corrosion-resistant flat steel products can be used for the application of the corrosion protection layer onto the steel core layer, which processes allow the large scale production of sheets suitable for the production of bipolar plates at minimised unit costs.

In addition to this, particular significance is also attached to the functional coating applied according to the invention to the corrosion protection layers. This functional coating is, in the case of a bipolar plate according to the invention, at least in the new state, likewise distributed over the whole surface of the corrosion protection layer. For the application of the functional coating, processes can therefore also be used such as are employed in the large-scale production of appropriately coated steel sheet material. The object of the functional coating is, on the one hand, to guarantee an adequate electrical conductivity of the bipolar plate according to the invention if the materials used for the core layer and the corrosion protection layer are themselves not electrically conductive at all, or only have inadequate conductivity. The electrically conductive functional coating enables as such a largely free choice of the materials used for the core layer and the corrosion protection layer. With a bipolar plate according to the invention, these can be selected in view of optimised mechanical suitability and a corrosion resistance equally optimally adapted to the particular circumstances.

As well as the electrical conductivity, another important property of the functional coating provided according to the invention lies in reducing to a minimum the quantity of the metal ions passing from the core layer or the corrosion protection layers into the fuel or the reaction product. In as much as the functional coating applied according to the invention onto the corrosion protection layer is essentially entirely impermeable for metal ions, contamination of the respective electrolytes used by particles deriving from the bipolar plate is particularly effectively prevented.

With regard to the fuel cell stack, the object referred to heretofore is achieved in that at least one of the bipolar plates of this stack, the bipolar plate(s) being arranged in each case between two electrolyte carriers, is designed in the manner according to the invention.

Bipolar plates constituted according to the invention are suitable, because of their special combination of properties, for use in any kind of fuel cell stacks in which they are subject to high mechanical loads and corrosive action and in which high demands are also made on their electrical function. Bipolar plates according to the invention can be used particularly well in fuel cell stacks of which the fuel cells belong to the PEM type operated in the lower temperature range of 20-120° C. and with which a proton conducting membrane is used as the electrolyte carrier. In addition to this, bipolar plates according to the invention can also be used particularly effectively in fuel cell stacks of which the fuel cells belong to the PAFC type operated at higher temperatures of 160-220° C. and with which typically fibre structures containing highly-concentrated phosphoric acid are provided as electrolyte carriers.

With the invention, bipolar plates are therefore provided which can be manufactured economically on the basis of composite materials which can be manufactured in a conventional manner. Thanks to the combination according to the invention of at least two layers applied on both sides over the whole surface of a steel sheet material serving as a core layer, of which layers one has the effect of protecting against corrosion and the other guarantees an adequate electrical conductivity of the bipolar plate and an adequate purity of the fluid coming into contact with the bipolar plate, not only is a reliable corrosion protection achieved, and therefore along with it a long-term stability which satisfies all requirements with a correspondingly long service life, but also an optimum electrical function both of the bipolar plate itself and of the electrolyte used in the respective fuel cell is assured.

Since, as a base product for the production of bipolar plates according to the invention, use is made of a sheet already finish-coated with all the coatings required, bipolar plates according to the invention can be shaped by simple shaping and joining operations of such sheets. This also contributes to bipolar plates according to the invention being provided at particularly favourable manufacturing costs.

In principle, any steel which has sufficient strength and deformability can be considered as a material for the core layer of a bipolar plate according to the invention. For the core layer of bipolar plates which are used in a PEM operated in the low temperature range, particularly economically obtainable quality steels are well-suited, such as soft low-alloyed steels with a carbon content of less than 0.2% by weight.

If it is intended that a bipolar plate according to the invention should be used at high temperatures and with particularly corrosive media in a PAFC, a particularly long service life of the bipolar plate can be guaranteed if the core layer consists of a special steel. Special steel inherently already has a high degree of resistance to corrosion. This property in itself already guarantees particularly long service lives, regardless of whether special steel is used for the core layer of a bipolar plate used in a PEM or a PAFC.

According to the invention, protection of the core layer against corrosion is assured thereby, that the metal material of at least one of the corrosion protection layers being a steel material with a higher corrosion resistance than the steel material of the core layer.

Particularly good protection against corrosion is obtained if the metal material of at least one of the corrosion protection layers is a special steel, in particular an austenitic special steel. The particular advantage of using a steel or another metallic material which behaves in a comparable manner under deformation lies in the fact that these materials can be applied particularly easily onto the core layer made of steel. Accordingly, the corrosion layer can be applied onto the core layer by, for example, roll cladding, in particular hot roll cladding, or a comparable process.

While the core layer can be coated with titanium and titanium alloys as well as other materials which can be worked and rolled out in block or sheet form in a simple manner by the roll cladding process already mentioned, in particular hot roll cladding, other materials which cannot be worked in this manner or only with difficulty can be applied, for example, by PVD coating. The term "PVD" in this context is understood to mean a coating method with which the particular metals or chemical compounds are deposited by the application of thermal energy or by particle impact in a high vacuum on the surface of the core layer which is to be coated. The coating material is converted for this purpose from a solid into the vapour phase and then condensed on the respective surface. The PVD processes also include ion plating and cathode sputtering. Naturally, Ti and all special higher-grade steels can also be applied onto the core layer in this manner. In order to guarantee an intensive and permanently secure connection between the core layer and the coating material, it is possible in this situation for a thermal treatment to be applied subsequently to the coating process, in the course of which an alloy layer forms, which contains the constituents of the steel material of the core layer and of the coating.

As a material for the functional coatings of the bipolar plate according to the invention, particularly well-suited are, for example, amorphous C/H coatings, such as DLC (Diamond Like Carbon) or GLC coatings (Graphite Like Carbon), or conductive plasma polymer coatings, such as amorphous Si/C/H coatings or Si/H coatings.

As an alternative or supplement, the functional coating can be formed from a conductive inorganic compound. As an organic compound, use can therefore be made of such as belong to the group of nitrides and/or carbonitrides, oxides and/or oxynitrides, in particular from the group of the metastable or non-stoichiometrical metal oxides, metal oxynitrides, or metal nitrides. Mention may be made, for example, of the inorganic oxides $TiO_2$, $ZrO_2$, $HfO_2$, $V_2O_5$, $Nb_2O_5$, $Ta_2O_5$, $CrO_2$, $MoO_2$, $WO_3$, $CoO_2$, $Co_2O_3$, $IrO_2$, NiO, CuO, $InO_2$ and $SnO_2$.

For the functional coating, elements belonging to the group "Au, Ni, Pd, Pt, Cu, Ag, Au" or their alloys can also be selected, which as well as good electrical conductivity also guarantee a good barrier effect against the passage of metal ions from the core layer or the corrosion protection layer.

Depending on the functions intended for them, "electrical conductivity" on the one hand and "barrier against the passage of metal ions" on the other, it may be appropriate for the functional coating itself to be made up of multiple layers. Accordingly, the functional coating can comprise a first layer, applied directly onto the corrosion protection layer, of a material which is particularly effective in preventing the passage of metal ions, such as the amorphous C/H coatings or plasma polymer coatings already referred to heretofore, and a layer applied onto that of a material which is a particularly good electrical conductor, which can be formed, for example, from one of the inorganic compounds likewise already mentioned, in particular from the group of nitrides and/or carbonitrides, oxides, and/or oxynitrides and/or from a metallic material belonging to the group "Au, Ni, Pd, Pt, Cu, Ag, Au" or their alloys.

As well as the PVD process, the CVD process is also suitable for the application of the functional coating onto the corrosion protection layer. With the CVD process, a gas mixture is introduced into the reaction chamber, which, due to a chemical reaction at high temperature, forms a solid and is deposited on the base material under the catalytic effect of the substrate surface. There is a plurality of variants of this process; a distinction is drawn, among others, between thermal CVD processes and plasma-activated CVD (PA-CVD). The most important reaction types with the first-named process are chemosynthesis, pyrolysis, and disproportioning. With the PA=CVD process, the chemical reactions are activated by a plasma. As well as the designation PAVCD, the term PE-CVD (PECVD, plasma enhanced CVD) also exists in the English literature.

The thickness of the core layer, the corrosion protection layers, and the functional coatings is selected as a function of the intended task in each case and of the materials from which the layer or coating concerned is produced. Accordingly, it may be a good idea, with regard to the stability required and the low thickness desired of the bipolar plate, for the thickness of the core layer to be set in the range from 1,000-1,000,000 nm.

In order to guarantee an adequate protective effect of the corrosion protection layer, its minimum thickness can be proposed as at least 10 nm up to a maximum of 100,000 nm. The very low coating thicknesses can in this situation be achieved by PVD or CVD coatings, while higher coating thicknesses of 10,000 nm and more can be produced in a simple manner, in particular by hot roll cladding.

For the functional coating, by contrast, a thickness should be taken as a basis in the range from 3 nm, in particular 10 nm, up to 10,000 nm, in order to be able to make use of its function reliably. Here too the principle applies that particularly thin and nevertheless effective functional coatings can be achieved by PVD or CVD coating.

Figure 2:
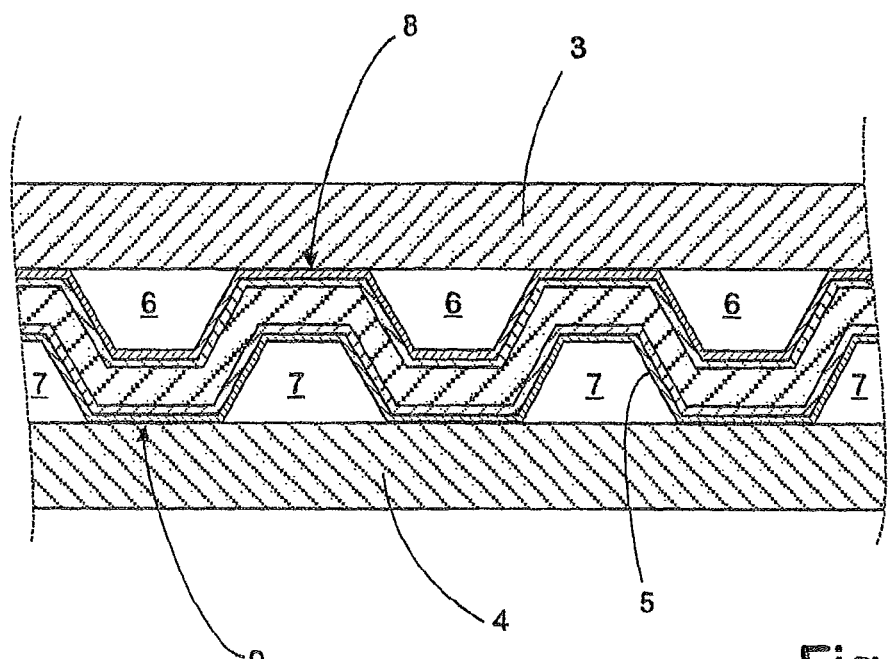
Figure 3:
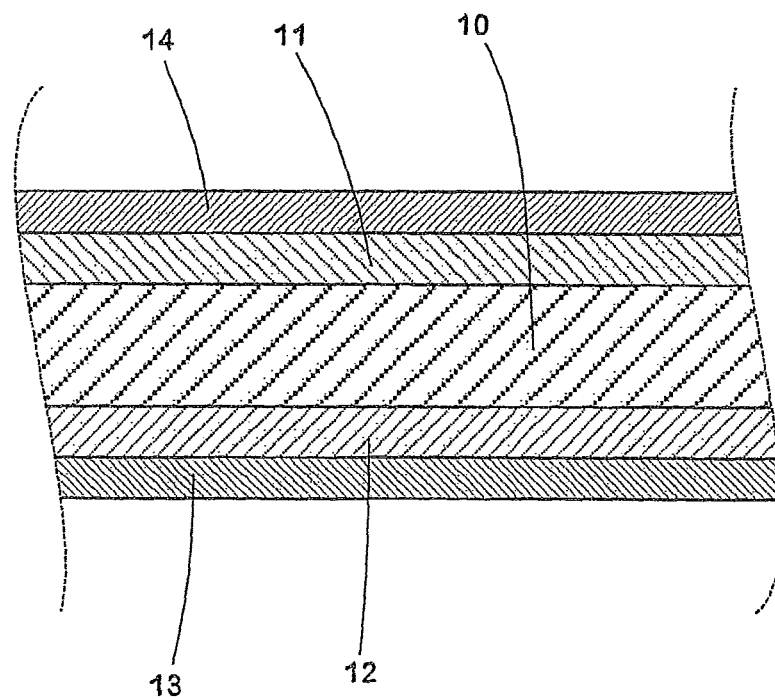

The invention is explained in greater detail hereinafter on the basis of exemplary embodiments. The figures show, in each case diagrammatically and not to scale:

FIG. 1 A fuel cell stack in a longitudinal section;

FIG. 2 A section of a bipolar plate with adjacent polymer membrane electrolytes in a longitudinal section;

FIG. 3 The coating structure of the bipolar plate in a greatly enlarged sectional view.

The fuel cell stack 1 shown in a greatly simplified representation in FIG. 1 comprises a plurality of fuel cells 2 of the PEM type, which as electrolyte carriers comprise in each case a polymer electrolyte membrane ("PEM"), not represented here. Applied onto the PEM, on both sides, over the whole surface, is a catalyst layer, likewise not shown here, and onto this, in each case, a gas diffusion layer is applied, also not visible in detail. The PEM forms, with the catalyst coatings and the gas diffusion layers, in each case a membrane electrode arrangement, "MEA", 3, 4.

Each of the MEAs 3, 4, is fixed in each case between a bipolar plate 5, by means of clamping screws S, extending over the entire length of the fuel cell stack 1 and supported by plates P arranged on the end side. Channels 6, 7 are formed into the bipolar plates 5 from one side and the other alternately. The channels 6 associated with the first side of the bipolar plates 5 are connected to a fuel delivery arrangement, not shown here, by means of which the hydrogen combusted in the fuel cells 2 passes into the channels 6. Opposite these, the channels 7, associated with the other side of the bipolar plates 5, conduct air or pure oxygen as well as the water occurring as a reaction product.

By means of the respective unshaped surface sections 8, 9 remaining between the channels 6, 7 of a side, the bipolar plates 5 are in electrically conductive contact with the MEA 3, 4 associated with their respective side.

The respective fuel cells 2, formed in this way, of the fuel cell stack 1 are connected in series in an inherently known manner, not shown here for ease of overview, such that they provide an adequate capacity for the supply of an electrical consumer, not shown.

As can be seen particularly clearly on the basis of the section represented in FIG. 3, the bipolar plates 5 in each case have a core layer 10, a corrosion protection layer 11, 12, being applied over the whole surface in each case onto the surfaces, associated with the MEAs 3, 4, of the core layer 10. The corrosion protection layers 11, 12, are in turn covered over the whole surface in each case by a functional coating 13, 14.

The structure of a fuel cell stack, the fuel cells of which are of the PAFC type, is in principle the same as that explained heretofore, wherein, instead of the MEAs as electrolyte carriers, fibre lattices are used, not represented here, in which the highly concentrated (90-100%) phosphoric acid is stored.

According to a first exemplary embodiment, particularly suitable for use in a high-temperature PAFC (max. temperature: 160° C.), the core layer 10 of the bipolar plates 5 consists in each case of a low-alloyed, commercially conventional special steel. A special steel which comes into question for this purpose is shown in the current Steel-Iron list under the material number 1.4000. Likewise, for example, the steels with the material numbers 1.4301, 1.4306, and 1.4401 or special steels of different compositions with comparable properties can be used. The corrosion protection layers 11, 12, applied onto the core layer 10 by roll cladding, consist by contrast of a commercially conventional special steel with high corrosion resistance, such as one of the steels listed under the material numbers 1.4539, 1.4465, or 1.45655.

As an alternative, the corrosion protection layers 11, 12, can also be formed by the PVD vapour deposition of Ta on the respective surfaces of the core layer 10. Regardless of how the corrosion protection layers 11, 12, are formed, one of the functional coatings 13, 14, consisting of Au is deposited onto them by PVD coating.

With a second exemplary embodiment, especially well-suited for use in a fuel cell of the PEM type (max. temperature: 80° C.), the core layer 10 of the bipolar plates 5 consists in each case of a soft and easily deformable quality steel, containing 0.06% by weight of C. The corrosion protection layers 11, 12, applied onto the core layer 10 by roll cladding, consist by contrast, in this example, of a special steel which is more corrosion resistant than the material of the core layer 10. In each case, a plurality of electrically conductive DLC coatings have then been formed onto the corrosion protection layers 11, 12, by CVD coating, which DLC coatings together form the respective functional coating 13, 14.

With a third exemplary embodiment, likewise particularly well-suited for use in a fuel cell of the PEM type (max. temperature: 80° C.), the core layer 10 of the bipolar plates 5 again consists in each case of the soft and easily deformable quality steel, containing less than 0.06% by weight of carbon. Formed onto this core layer 10 are the corrosion protection layers 11, 12, by PVD vapour deposition with gold. The functional coatings 13, 14, applied in each case onto the corrosion protection layers 11, 12, consist in this case of an electrically conductive plasma polymer, applied by CVD coating.

REFERENCE NUMBERS

1 Fuel cell stack
2 Fuel cells
3,4 Membrane electrode arrangements, "MEA"
5 Bipolar plates
5,6 Channels
8,9 Unformed surface sections of the bipolar plates 5
10 Core layer of the bipolar plates 5, consisting of steel material
11,12 Corrosion protection layers of the bipolar plates 5, consisting of metallic material
13,14 Functional coatings of the bipolar plates 5, consisting of an electrically conductive material, obstructing the passage of metal ions
P End-side plates of the fuel cell stack 1
S Clamping screws of the fuel cell stack 1

The invention claimed is:

1. A bipolar plate for a fuel cell with a core layer consisting of a steel material, the surfaces of said core layer, which are associated with the respective electrolyte carriers of the fuel cell, being provided in each case with a corrosion protection layer, protecting the core layer against corrosion,
wherein the corrosion protection layers consist in each case of a metal material and extend in each case on both sides over the whole surface of the core layer;
wherein the corrosion protection layers are in turn coated in each case over the whole surface with an electrically conductive functional coating, which is essentially entirely impermeable for the metal ions emerging from the core layer, the corrosion protection layers, or both;
wherein the metal material of at least one of the corrosion protection layers is a steel material with a higher corrosion resistance than the steel material of the core layer; and
wherein the functional coating comprises two layers in which the first layer is applied directly onto the corrosion protection layer and formed as an amorphous C/H coating or plasma polymer coating and in which the second layer is applied on the first layer and formed from a conductive inorganic compound.

2. The bipolar plate according to claim 1, wherein the metal material of at least one of the corrosion protection layers is a special steel.

3. The bipolar plate according to claim 1, wherein the inorganic compound is a nitride, carbonitride, oxide, oxynitride, or a combination or mixture thereof.

4. The bipolar plate according to claim 1, wherein the material of the functional coating is Ni, Pd, Pt, Cu, Ag, Au, or their alloys.

5. The bipolar plate according to claim 1, wherein the thickness of the corrosion protection layer is at least 10 nm.

6. The bipolar plate according to claim 1, wherein the thickness of the functional coating is at least 3 nm.

7. The bipolar plate according to claim 1, wherein the core layer consists of a special steel.

8. The bipolar plate according to claim 1, wherein the core layer is produced from a quality steel.

9. A fuel cell stack with at least two electrolyte carriers, between which is arranged a bipolar plate according to claim 1.

10. A fuel cell according to claim 9, wherein the electrolyte carrier is designed as a proton conducting membrane.

11. A fuel cell according to claim 9, wherein the electrolyte carrier is designed as a fibre structure containing highly concentrated phosphoric acid.

12. The bipolar plate according to claim 1, further comprising an alloy layer between the core layer and each corrosion protection layer, wherein the alloy layer contains constituents of the steel material of the core layer and the metal material of the respective corrosion protection layer.

13. A bipolar plate for a fuel cell, comprising:
a core layer comprised of a steel material;
a corrosion protection layer extending on both sides over the whole surface of the core layer, the corrosion protection layer comprised of a metal material, wherein the metal material of at least one of the corrosion protection layers is a steel material with a higher corrosion resistance than the steel material of the core layer; and
an electrically conductive functional coating over the whole surface of each corrosion protection layer, the electrically conductive functional coating being essentially entirely impermeable for the metal ions of the core layer, the corrosion protection layers, or both:
wherein the functional coating comprises two layers in which the first layer is applied directly onto the corrosion protection layer and formed as an amorphous C/H coating or plasma polymer coating and in which the second layer is applied on the first layer and formed from a conductive inorganic compound.

14. A method of manufacturing a bipolar plate for a fuel cell, comprising:
providing a core layer comprised of a steel material;
applying a corrosion protection layer on both sides over the whole surface of the core layer, the corrosion protection layer comprised of a metal material, wherein the metal material of at least one of the corrosion protection layers is a steel material with a higher corrosion resistance than the steel material of the core layer; and
applying an electrically conductive functional coating over the whole surface of each corrosion protection layer, the electrically conductive functional coating being essentially entirely impermeable for the metal ions of the core layer, the corrosion protection layers, or both,
wherein the functional coating comprises two layers in which the first layer is applied directly onto the corrosion protection layer and formed as an amorphous C/H coating or plasma polymer coating and in which the second layer is applied on the first layer and formed from a conductive inorganic compound.

15. The method according to claim 14, wherein the metal material of the corrosion protection layer is applied onto the core layer by roll cladding.

16. The method according to claim 14, wherein the metal material of the corrosion protection layer is applied onto the core layer by PVD coating.

17. The method according to claim 14, wherein the electrically conductive functional coating is applied onto the corrosion protection layers by PVD coating or CVD coating.

* * * * *